US010081406B2

(12) United States Patent
Blake

(10) Patent No.: US 10,081,406 B2
(45) Date of Patent: Sep. 25, 2018

(54) QUICK-ASSEMBLY BICYCLE COMPONENTS

(71) Applicant: Terence Gregory Blake, Madison, WI (US)

(72) Inventor: Terence Gregory Blake, Madison, WI (US)

(*) Notice: Subject to any disclaimer, the term of this patent is extended or adjusted under 35 U.S.C. 154(b) by 205 days.

(21) Appl. No.: 15/089,623

(22) Filed: Apr. 4, 2016

(65) Prior Publication Data

US 2018/0237097 A1    Aug. 23, 2018

(51) Int. Cl.
*B62H 1/12*    (2006.01)
*B62K 15/00*    (2006.01)
*B62K 3/02*    (2006.01)

(52) U.S. Cl.
CPC .............. *B62K 15/00* (2013.01); *B62H 1/12* (2013.01); *B62K 3/02* (2013.01); *B62K 2015/001* (2013.01)

(58) Field of Classification Search
CPC .............. B62K 15/00; B62K 2015/001; B62K 2015/003; B62K 21/18; B62K 21/22; B62K 21/24; B62M 3/00; B62M 3/08; A63B 69/16; A63B 69/166; A63B 69/167; A63B 2069/16; A63B 2069/166; B62H 1/12; F16B 7/042
USPC .............. 280/278, 287; 74/594.7; 403/109.3
See application file for complete search history.

(56) References Cited

U.S. PATENT DOCUMENTS

| 2,427,841 | A | * | 9/1947 | Morris | E04H 12/182 |
| | | | | | 248/188.5 |
| 3,422,701 | A | * | 1/1969 | Boisis | B62M 3/00 |
| | | | | | 74/594.7 |
| 4,247,216 | A | * | 1/1981 | Pansini | B25G 3/18 |
| | | | | | 15/1.7 |
| 4,934,210 | A | * | 6/1990 | Suzuki | B62J 25/00 |
| | | | | | 74/512 |
| 5,375,938 | A | * | 12/1994 | Bartlow | B25G 1/04 |
| | | | | | 15/144.4 |
| 5,387,048 | A | * | 2/1995 | Kuo | A45B 19/04 |
| | | | | | 135/25.1 |
| 5,779,386 | A | * | 7/1998 | Eichhorn | A47D 13/105 |
| | | | | | 403/109.3 |
| 6,698,781 | B1 | | 3/2004 | Blake | |
| 6,708,998 | B1 | | 3/2004 | Blake | |
| 6,709,000 | B1 | | 3/2004 | Blake | |

(Continued)

*Primary Examiner* — Anne Marie M Boehler
(74) *Attorney, Agent, or Firm* — Craig A. Fieschko, Esq.; Dewitt Ross & Stevens S.C.

(57) ABSTRACT

Tool-free bicycle components include a pedal assembly with pedals shipped in "folded" positions and rotated by hand into locked "open" positions for riding. A locking member nests in an axle notch to rotationally lock the pedals in place. A stem-fork assembly includes a fork unit having a fork post with a slidable compression ring covering a spring-biased stem locking member. The fork post is inserted into a stem tube of a stem unit, pushing the ring down and exposing the stem locking member, which can then "snap" into the stem tube to lock the fork unit with the stem unit. A training wheel assembly includes a mounting unit having a spring member with a bendable engagement end. When a wheel support with engagement slot is inserted into the mounting unit, the spring member snaps into the engagement slot to lock the training wheel support in place.

28 Claims, 11 Drawing Sheets

(56) References Cited

U.S. PATENT DOCUMENTS

| | | | |
|---|---|---|---|
| 8,517,406 B2 * | 8/2013 | Diekman | B62K 15/006 280/278 |
| 9,889,904 B1 | 2/2018 | Blake | |
| 2004/0007089 A1 * | 1/2004 | Fan | B62K 15/00 74/594.1 |
| 2004/0194572 A1 * | 10/2004 | Kim | B62M 3/02 74/594.3 |

* cited by examiner

QUICK-ASSEMBLY BICYCLE COMPONENTS

FIELD OF THE INVENTION

This document concerns an invention relating generally to easy-to-assemble bicycles, and more specifically to components of bicycles that can be assembled without using tools.

BACKGROUND OF THE INVENTION

Bicycles are normally shipped to consumers and retailers in a relatively compact, unassembled form. This saves space and passes the costs of assembly "down" in the supply chain. But assembling bicycles involves many complicated steps unknown to the unskilled technician, mechanic, end user, or other layperson. Detailed adjustments and fine-tuning are necessary for proper functioning of bicycles, such as alignment of parts, orientation of the front wheel, fork, and stem, and proper bolt torque. This requires a certain familiarity and comfort with bicycles and with using the right tools correctly. As a result, unskilled assemblers may employ excessive and undesirable "guesswork." Assuming it is usable in the first place, an improperly-assembled bicycle may be uncomfortable to ride, may suffer decreased performance, and may experience undue wear or premature component failure.

The assembly processes thus require tedious attention. For retailers, even a few seconds of extra time required during assembly of each bicycle substantially increases costs and reduces the number of bicycles a retailer is otherwise able to assemble and sell. Difficulty in the process of assembling translates to more potential sources of error, and means employees require more training to be able to assist in assembling bicycles. In the case of end users receiving unassembled bicycles from manufacturers, distributors, and retailers, assembly can take a substantial amount of time, and often leaves the assembler uncertain about whether the bicycle was properly assembled and optimized for performance and safety. When a bicycle is for a child, the child is forced to wait until someone is available, with the necessary tools and work space, to begin assembling a new bicycle, and then wait an undetermined length of time for the assembly process to be completed. Assembly of children's bicycles can be of particular concern, as an improperly-assembled child's bicycle can impede the learning process, take away from the enjoyment of riding a bicycle, and possibly even increase the risks of injury.

What is needed is a system that simplifies the steps involved in assembling bicycles and reduces or altogether eliminates the need for tools. A bicycle that can be more quickly assembled, in a manner that reduces uncertainty by limiting the ability to make errors, can make bicycle assembly and riding more enjoyable, enhance riding performance, extend the life of bicycles, and reduce the risk of certain failures and injuries.

SUMMARY OF THE INVENTION

The invention, which is defined by the claims set forth at the end of this document, is directed to easy-to-assemble bicycle components that at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

A bicycle that can be shipped relatively compactly and assembled without tools includes one or more of an exemplary pedal assembly 100 (FIGS. 1-3), an exemplary stem-fork assembly 400 (FIGS. 4-8), and an exemplary training wheel assembly 900 (FIGS. 9-11). The exemplary pedal assembly 100 of FIGS. 1-3 includes a pedal axle 110 with pedal bodies 120 extending therefrom, the pedal axle 110 having an axle notch 130 formed therein. A crank arm 140 extends through the pedal axle 110, and a pedal locking member 150 extends outwards from the crank arm 140. The pedal locking member 150 is sized to fit in the axle notch 130. A pedal spring 160 situated about the crank arm 140 urges the pedal axle 110 against the pedal locking member 150. The pedal assembly 100 can be shipped with pedal bodies 120 in their folded positions (FIG. 1A). The pedal axle 110 is rotatable about the crank arm 140 by hand until the pedal locking member 150 aligns with the axle notch 130 and is nested in the axle notch 130. With the pedal locking member 150 received in the axle notch 130, the pedal axle 110 is rotationally locked with respect to the crank arm 140, and the pedal bodies 120 are in their "open" positions (FIG. 1B) and ready for use.

Turning to the exemplary stem-fork assembly 400 of FIGS. 4-8, a fork unit 410 includes an elongated fork post 420 with a fork locking member 430 positioned therein. The fork locking member 430 is spring-biased to radially exit the fork post 420 through a fork locking aperture 440 formed in the wall of the fork post 420. A stem unit 450 (to which handlebars are secured) includes a stem tube 460 sized such that the fork post 420 can be inserted through the stem tube 460. The stem tube 460 has a stem locking aperture 470 formed in its wall, and a slidable compression ring 480 fits about the fork post 420 so as to cover the fork locking aperture 440. The fork post 420 and compression ring 480 are sized such that insertion of the fork post 420 in the stem tube 460 pushes the compression ring 480 past the fork locking aperture 440 to expose the fork locking member 430. When the fork locking aperture 440 is aligned with the fork locking member 430 such that the fork locking member 430 is urged through the fork locking aperture 440 and into the stem locking aperture 470, the stem tube 460 is axially ("upwards"/"downwards" when oriented upright) and rotationally locked with respect to the fork post 420.

Turning to FIGS. 9-11, the exemplary training wheel assembly 900 includes a mounting unit 910 with a wheel spring member 920 positioned in a wheel spring housing 930. The wheel spring member 920 includes a medial portion 940, with an engagement end 950 and a tension end 960 extending from opposing sides of the medial portion 940. The engagement end 950 and the tension end 960 are resiliently flexible and behave like a spring by resisting being bent. A training wheel support 970 extends from an insertion end 980 to a wheel end 990, with the training wheel (not pictured) being securable to the wheel end 990. The insertion end 980 includes an engagement slot 1000 with a wheel spring engagement surface 1010, wherein the training wheel support 970 is securable to the mounting unit 910 by sliding the insertion end 980 into the mounting unit 910 such that the tension end 960 of the wheel spring member 920 passes through the engagement slot 1000, and the engagement end 950 of the wheel spring member 920 engages the wheel spring engagement surface 1010 of the engagement slot 1000.

Assembly of a bicycle with all three tool-free assemblies 100, 400, 900, once removed from its packaging, involves rotating the pedal bodies 120 until they snap into ridable positions, inserting the stem unit 450 about the fork unit 410 until they snap together, and inserting the training wheel supports 970 into the mounting units 910 until they snap together. No tools are required to assemble, install, and/or adjust these components so they are in proper alignment and are ready for riding.

Further advantages and features of the invention will be apparent from the remainder of this document in conjunction with the associated drawings.

DETAILED DESCRIPTION OF PREFERRED VERSIONS OF THE INVENTION

Figure 1A:
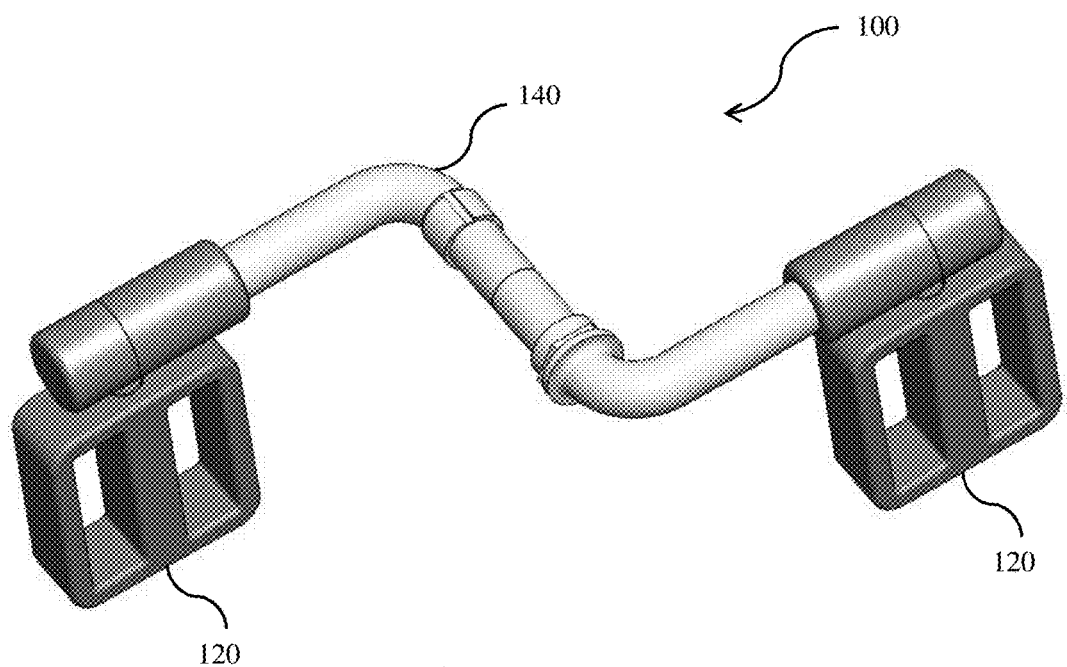
FIG. 1A shows an exemplary pedal assembly 100 with two pedal bodies 120 in a folded position (well-suited for shipping).
Figure 1B:
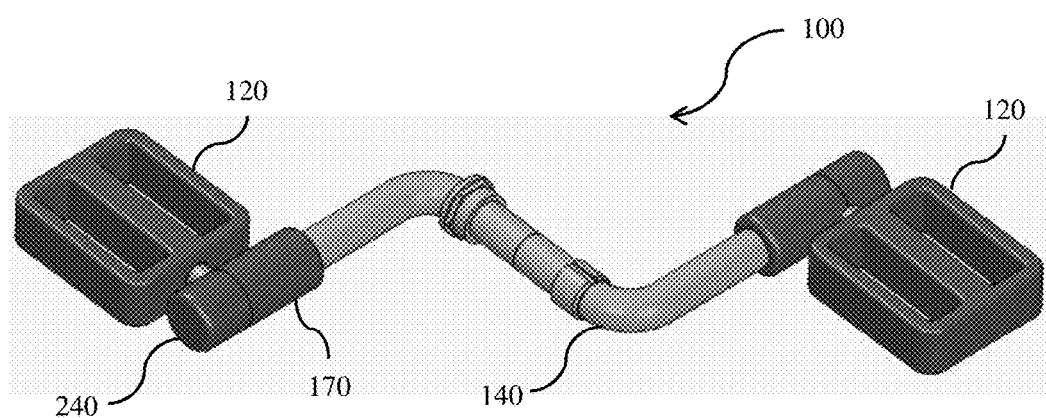
FIG. 1B is the exemplary pedal assembly 100 of FIG. 1A transitioned to an open position during assembly.

Turning initially to FIGS. 1A and 1B, the exemplary pedal assembly 100 includes a pair of pedal bodies 120 on opposing ends of a crank arm 140. In FIG. 1A, the pedal assembly 100 is in its "folded" position, with the pedal bodies 120 pointing in the same direction (along a "vertical" or "downwards"/"upwards" axis when installed in an upright bicycle) away from the crank arm 140. This can help reduce the overall width of the pedal assembly 100, and allows the pedal assembly 100 to be more compact for shipping. This is a significant advantage, as inefficient use of space in packages tends to increase costs. In FIG. 1B, the pedal assembly 100 is in an open or "engaged" position, with the pedal bodies 120 pointing in opposing directions ("outwards" away from each other, or "left" and "right" when installed in an upright bicycle) from the crank arm 140. As depicted in FIGS. 1A and 1B, each pedal body 120 rotates approximately 90 degrees between its folded position and its open position. The pedal bodies 120 can be turned from their folded positions by hand, without the need for any tools. Once the pedal bodies 120 have been rotated to their open or engaged positions, the pedal bodies 120 rotationally lock in place and are in their ridable configuration. The pedal bodies 120 cannot be disengaged—i.e., the rotational lock is irreversible—without the use of tools, such that the pedal bodies 120 no longer rotate about the crank arm 140 using the hand or foot during normal use. Although the pedal bodies 120 are rotationally fixed with respect to the crank arm 140, they are free to rotate normally like standard pedals (about an axis that is perpendicular to that of the crank arm 140) as the bicycle is pedaled.

Figure 2A:
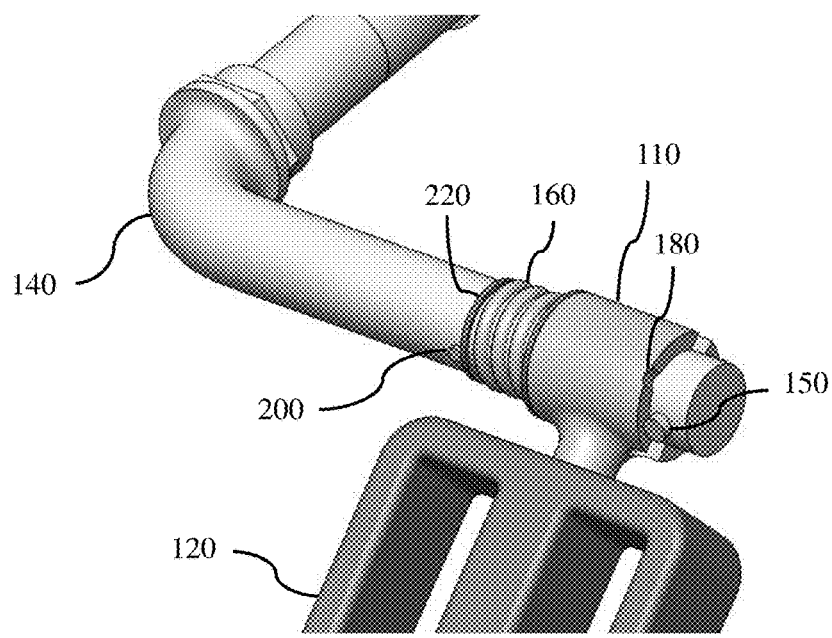
FIG. 2A shows the pedal assembly 100 of FIGS. 1A and 1B "mid-rotation" between the folded position of FIG. 1A and the open position of FIG. 1B, with a pedal cover 170 removed to show a shallow detente 180 in which a pedal locking member 150 nests when the pedal assembly 100 is in the folded position.
Figure 2B:
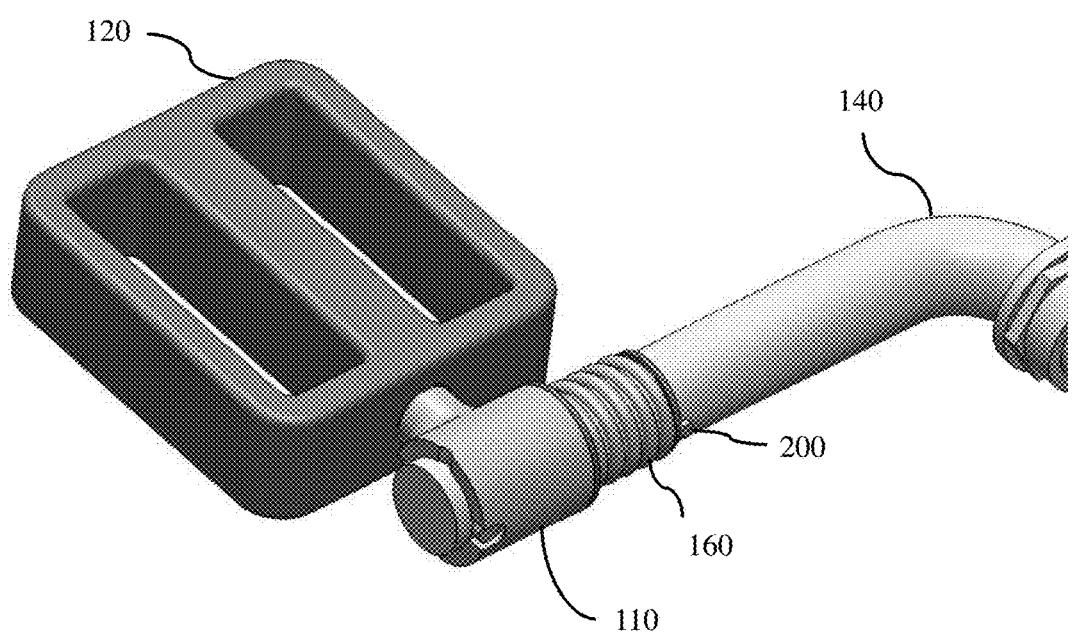
FIG. 2B is a close-up view of one of the pedal bodies 120 of FIG. 1B, with the pedal cover 170 removed to reveal the pedal locking member 150 nested in an axle notch 130 when the pedal assembly 100 is the open position.
Figure 3:
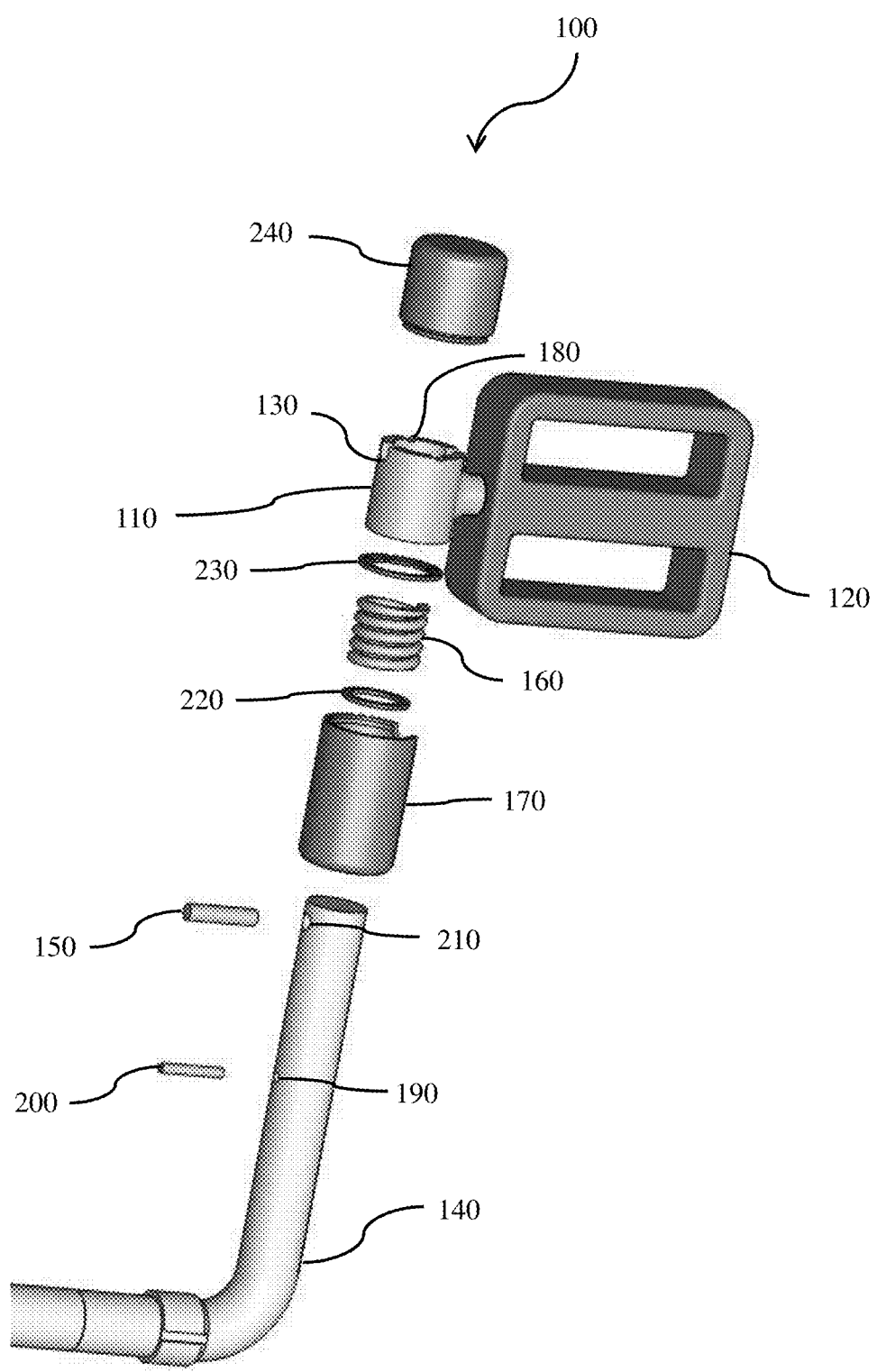
FIG. 3 is an expanded view of the components of the pedal assembly 100 of FIGS. 1A and 1B.
Figure 4A:
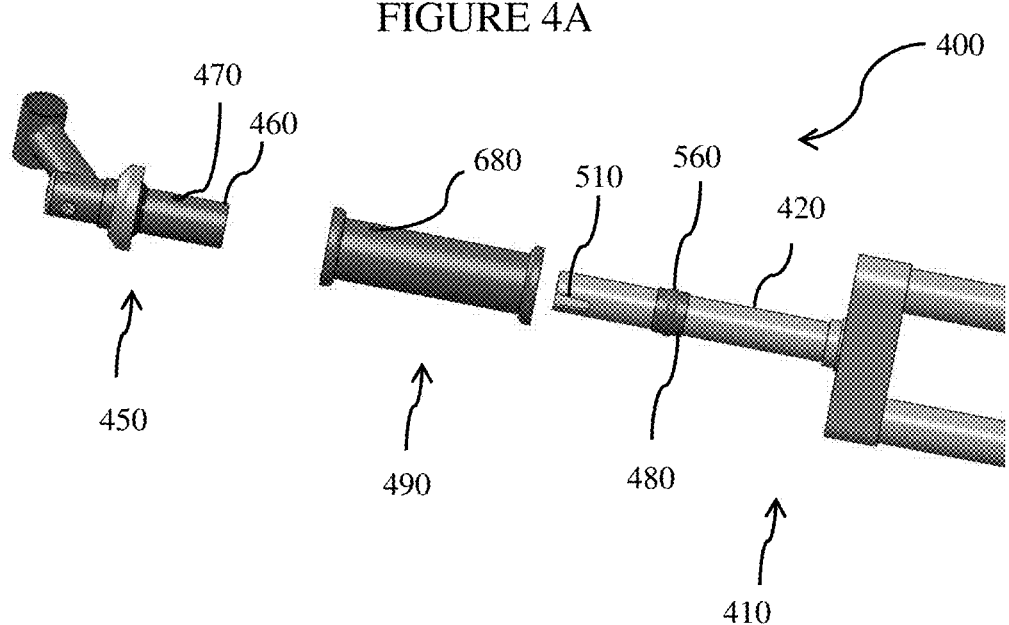
FIG. 4A shows an exemplary stem-fork assembly 400 before it is assembled, with a headtube 490 situated between a stem unit 450 and a fork unit 410.
Figure 4B:
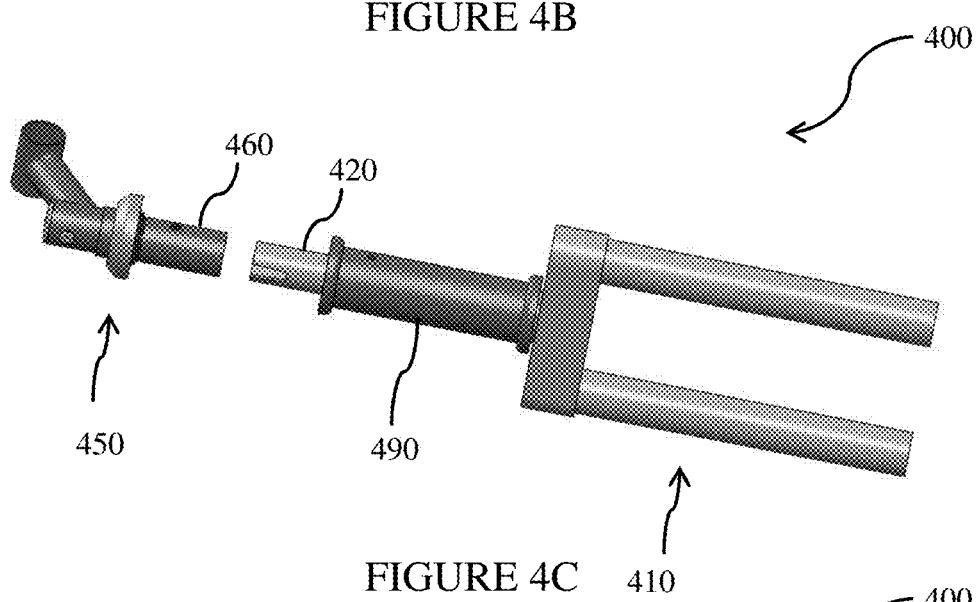
FIG. 4B shows the stem-fork assembly 400 of FIG. 4A with a fork post 420 of the fork unit 410 inserted into the headtube 490.
Figure 4C:
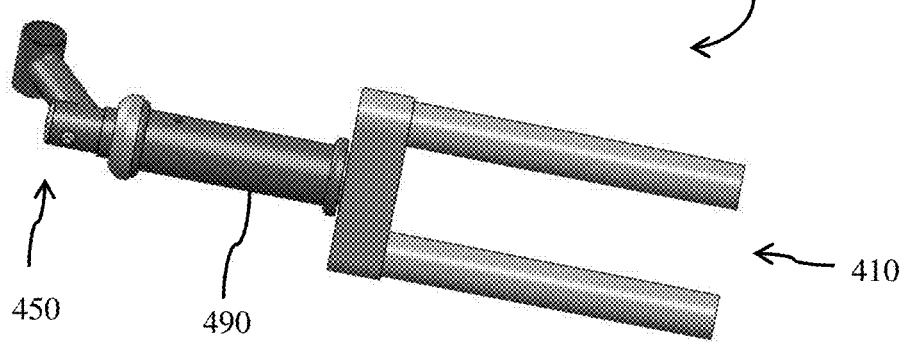
FIG. 4C shows the stem-fork assembly 400 of FIGS. 4A and 4B with the fork post 420 of the fork unit 410 inserted into a stem tube 460 of the stem unit 450.

Referring to FIGS. 2A, 2B, and 3, a pedal axle 110 extends from each pedal body 120, and the crank arm 140 is inserted through the pedal axle 110. The crank arm 140 includes a pedal spring member aperture 190 formed therein, and a pedal spring member 200 (such as a cylindrical spring pin) extends through the pedal spring member aperture 190 of the crank arm 140. Also formed in the crank arm 140 is a pedal locking member aperture 210, through which the pedal locking member 150 (such as a cylindrical locking pin) protrudes. The pedal spring member aperture 190 and the pedal locking member aperture 210 can each include a pair of holes on opposing sides of the crank arm 140 (i.e., separated by 180 degrees circumferentially about the crank arm 140), with the pedal spring member 200 and the pedal locking member 150 being long enough to enter both of the holes—and protrude out of at least one of the holes—in their corresponding pair of holes. A pedal spring 160 (which is a compression coil spring) is situated about the crank arm 140. The pedal spring member 200 is at least partially compressed between the pedal locking member 150 and the pedal spring member 200, spring-biasing the pedal axle 110 towards the pedal locking member 150.

Formed in the pedal axle 110 is the relatively "deep" axle notch 130, sized to complementarily receive all (or substantially all) of the pedal locking member 150 therein: when the axle notch 130 and the pedal locking member 150 are rotationally aligned, the compressed pedal spring 160 urges the pedal locking member 150 into the axle notch 130 (see FIB. 2B). When the pedal locking member 150 is received in the axle notch 130, the pedal axle 110 is no longer free to rotate about the crank arm 140, and the shape of the axle notch 130 preferably is tight/snug about the pedal locking member 150 so as to provide a firm hold that reduces or minimizes relative movement allowed by slack (i.e., resists or eliminates rattling and "play").

Also formed in the pedal axle 110 is a shallow detente 180—i.e., a dip, indentation, groove, or sink—that is not as "deep" as the axle notch 130. The shallow detente 180 is positioned about the pedal axle 110 such that when the pedal body 120 is in the desired folded position, the pedal locking member 150 is received ("nested") in the shallow detente 180. More torque is required to rotate the pedal axle 110 about the crank arm 140 when the pedal locking member 150 is nested in the shallow detente 180 than when the locking member is urged against a smooth (non-dipping) edge of the pedal axle 110 (here, when the locking member is circumferentially between the axle notch 130 and the shallow detente 180). This relatively small resistance to rotation allows the pedal bodies 120 to be "held" or "rested" in the folded position without being rotationally "locked" in that position, allowing a user to rotate the pedal bodies 120 by hand to bring the pedal locking member 150 out of the shallow detente 180 and towards the axle notch 130 (see FIG. 2A). As shown in FIGS. 2A and 2B, the shallow detente 180 is about 90 degrees from the axle notch 130, but this separation is customizable depending on the desired relative positions of the pedal bodies 120 in their respective folded and open positions.

A pedal spring washer 220 and a press washer 230 sandwich the pedal spring 160 to enhance contact and provide stability. The press washer 230 and pedal spring 160 help keep relatively constant tension on the pedal axle 110 during operation. A pedal cover 170 and a pedal cap 240 confine components (the pedal spring member 200, the pedal spring washer 220, the pedal spring 160, the press washer 230, and the pedal locking member 150) in place and restrict access thereto to prevent users from easily "unlocking" or "disengaging" the pedal bodies 120 out of their open positions inadvertently (at least without appropriate tools).

Figure 5A:
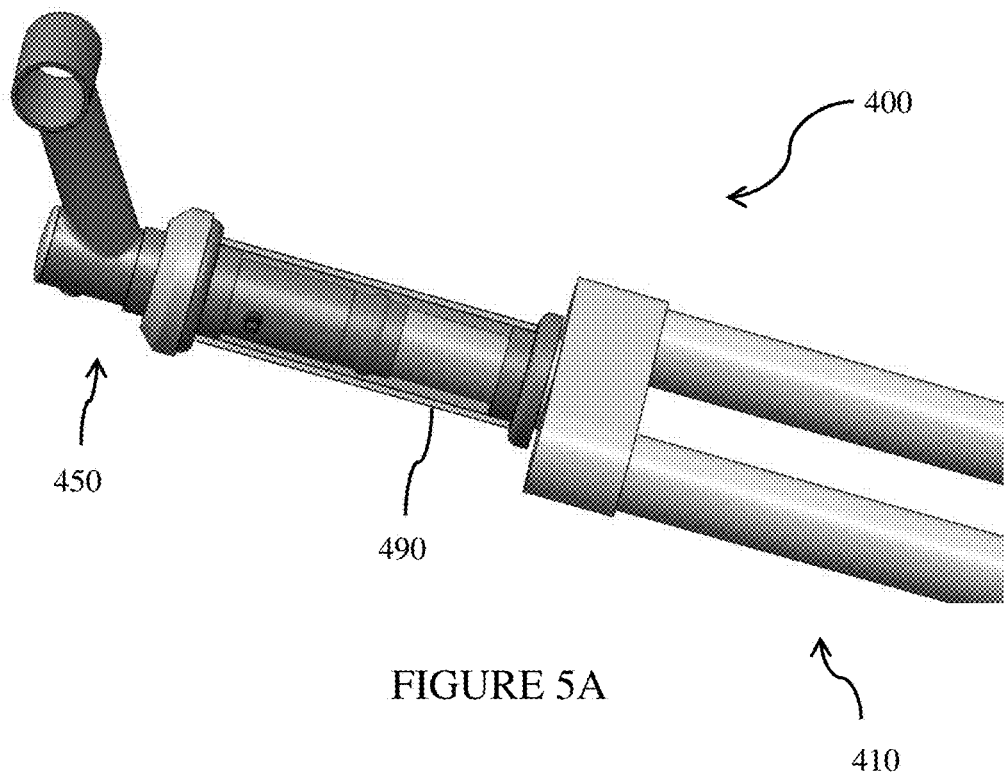
FIG. 5A shows the fork unit 410 of FIG. 4C with a transparent headtube 490 to reveal the relative positions of the fork post 420, the stem tube 460, and a slidable compression ring 480.
Figure 5B:
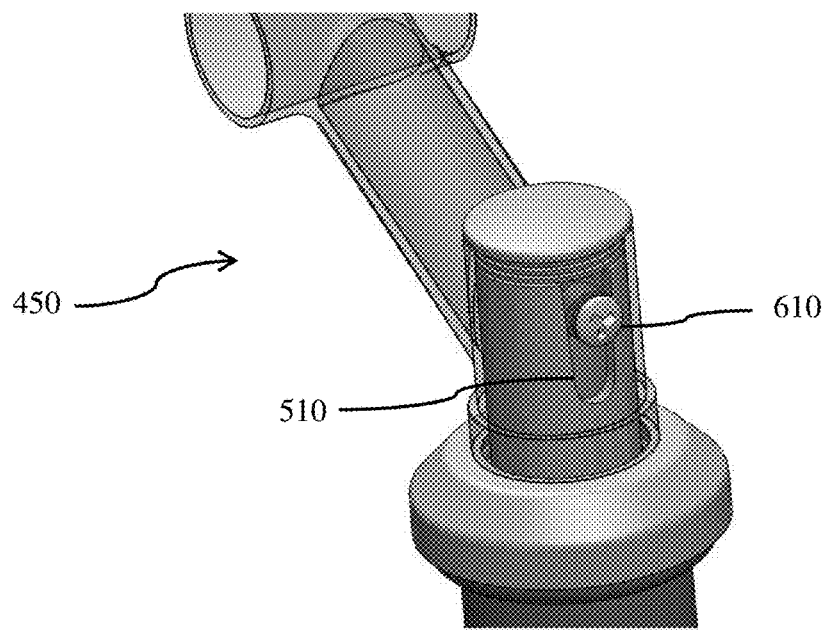
FIG. 5B is a close-up of the stem unit 450 with fork unit 410 of FIG. 4C, with a portion made transparent to show an engagement member 500 in an alignment slot 510.
Figure 6:
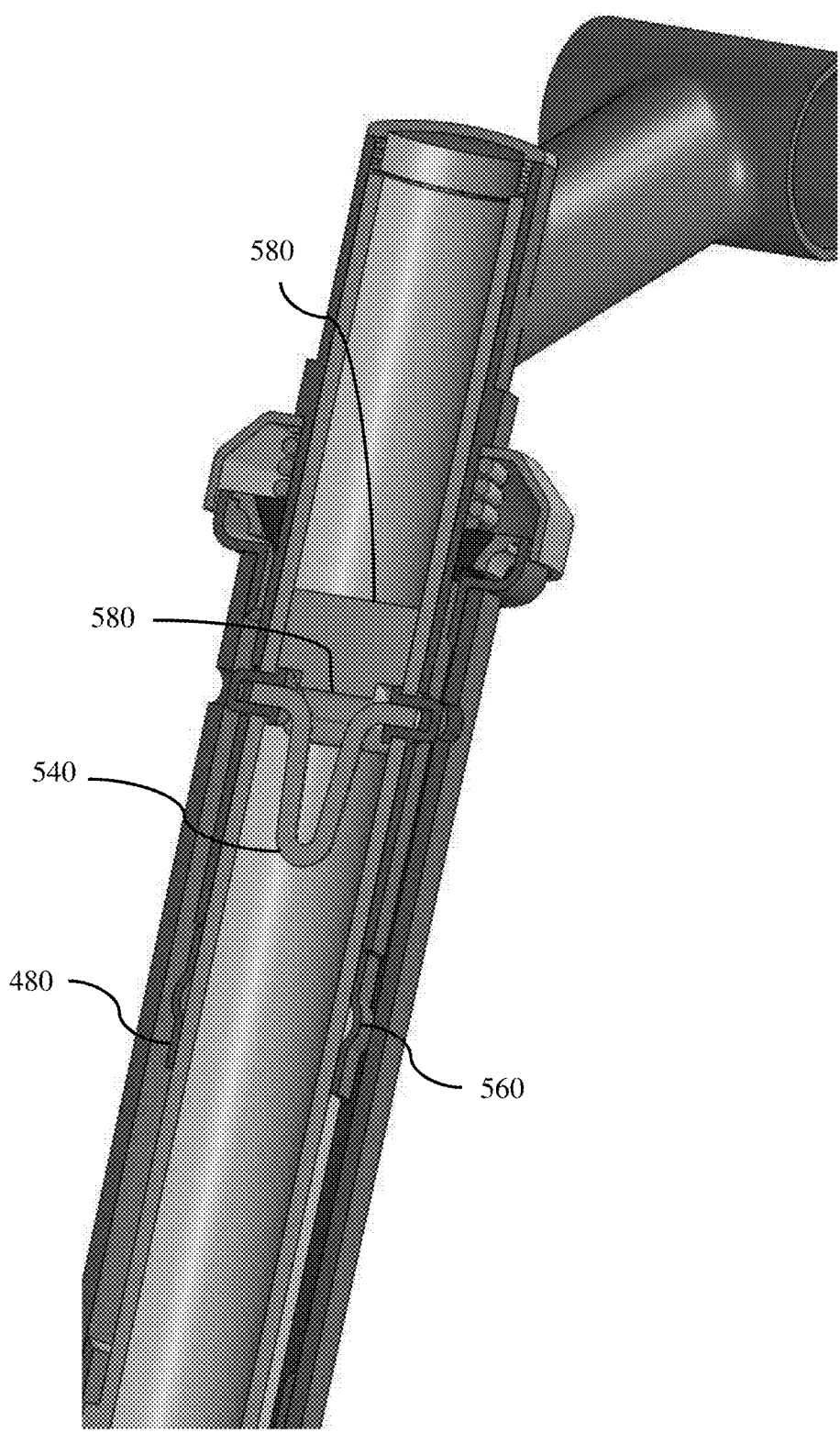
FIG. 6 is a cross-section of the fork unit 410 of FIG. 5A through a coronal (left-right) plane that separates the front side and back side of an exemplary bicycle.
Figure 7:
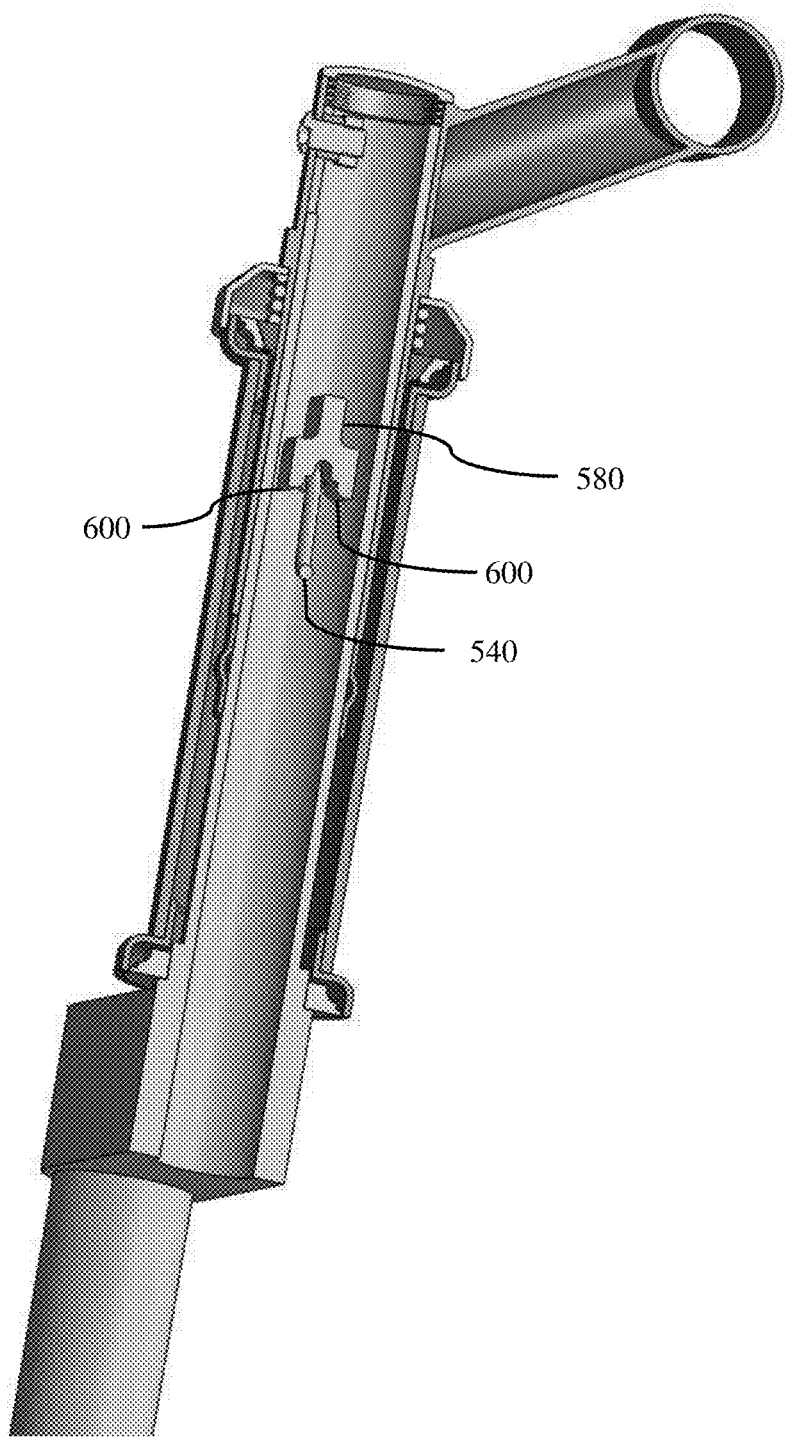
FIG. 7 is a cross-section of the fork unit 410 of FIG. 6 through a lateral (forward-rearward) plane that separates the left and right sides of an exemplary bicycle.
Figure 8:
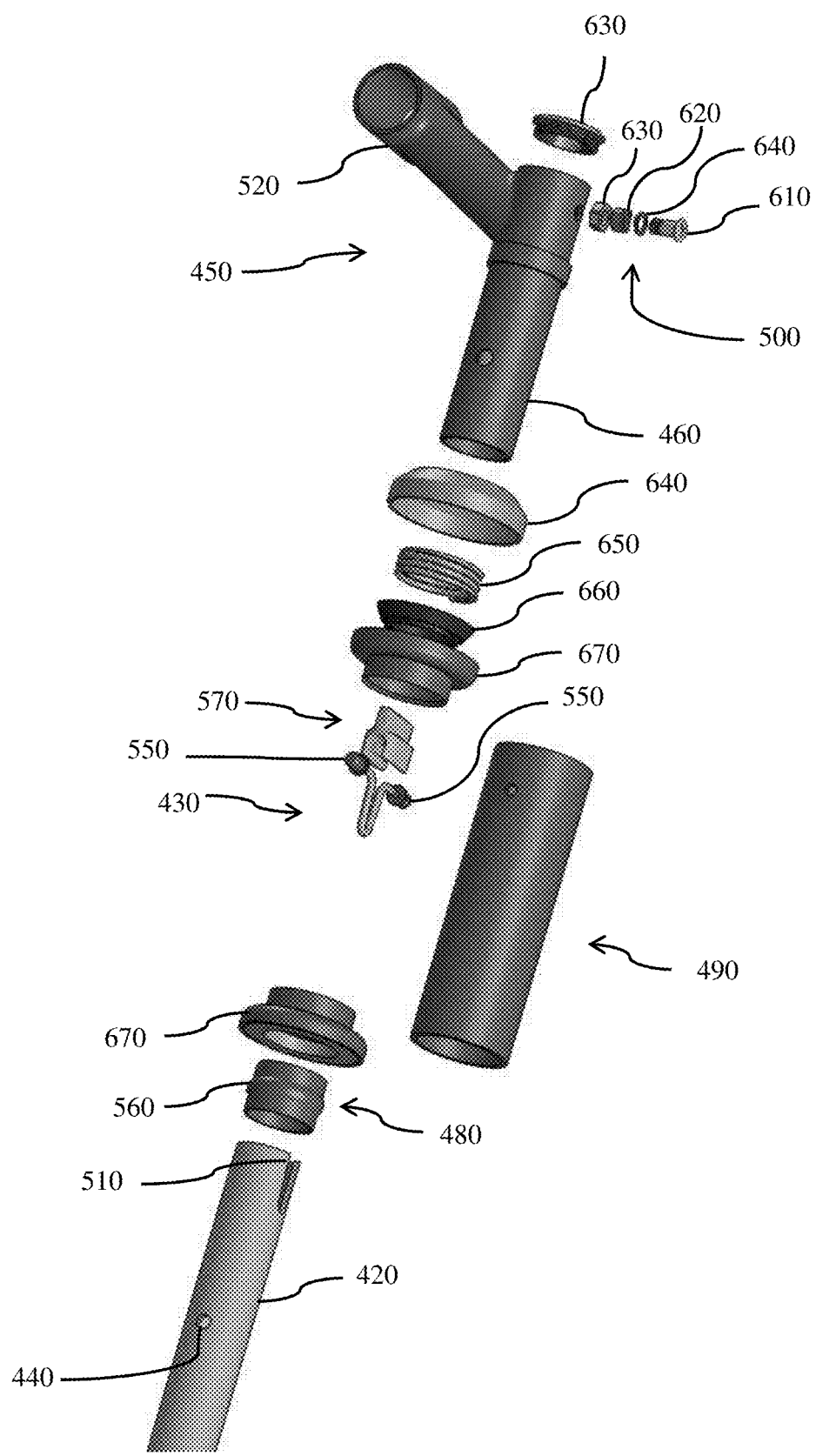
FIG. 8 is an expanded view of the components of the stem-fork assembly 400 of FIGS. 4A-4C.

Turning to the stem-fork assembly 400 of FIGS. 4-8, and in particular to FIG. 8 initially, the stem unit 450 includes the stem tube 460 extending from a handlebar adapter 520 (to which handlebars can be secured). The stem tube 460 includes a stem engagement member aperture 530 and a stem locking aperture 470. The fork post 420 of the fork unit 410 includes a fork locking aperture 440, and an alignment slot 510 formed at one end. Referring to FIGS. 4A-C and 5A, when the stem tube 460 receives the fork post 420 therein, the compression ring 480 is displaced by the stem tube 460. Referring also to FIG. 6, once the compression ring 480 has been slid out of the way to expose the fork locking aperture 440, with the stem locking aperture 470 in alignment with the fork locking aperture 440, the spring-biased fork locking member 430 can exit the fork locking aperture 440 and enter the stem locking aperture 470. In this way, the stem unit 450 "snaps" together with the fork unit 410 to secure the two together. The stem tube 460 cannot freely be rotated or be pulled out of the fork unit 410, so the two are vertically and rotationally "locked" with respect to one another.

The fork locking member 430 includes a V-shaped fork locking body 540 and a pair of fork locking pins 550. The fork locking body 540 is resiliently flexible, such that the fork locking member 430 resists being "squeezed" and provides outward spring-action when compressed. The fork locking member 430 is sized such that it is compressed to fit in the fork post 420. The compression ring 480 can include a rounded bulge 560 sized to receive therein a small portion of the fork locking pins 550. This helps maintain the axial position of the compression ring 480 about the fork post 420 until displaced, in a fashion similar to that of the pedal locking member 150 and the nesting thereof in the shallow detente 180 formed in the pedal axle 110, discussed above.

A fork locking guide 570 with a guide body 580 and a guide extension 590, is preferably situated in the fork post 420 so as to restrict the fork locking body 540 from compressing to the extent that the fork locking member 430 would "fall through" the fork post 420 (or would otherwise move axially within the fork post 420 such that the fork locking pins 550 move out of alignment with the fork locking aperture 440). As can be seen in FIG. 6, the guide body 580 abuts the inside of the fork post 420, while the guide extension 590 extends between the fork locking pins 550 to obstruct excessive inward movement of the fork locking pins 550. As can be seen in FIG. 7, the fork locking guide 570 also includes a pair of guide arms 600 that help to keep the fork locking member 430 in place within the fork post 420.

Returning to FIG. 8, the engagement member 500 includes an engagement fastener 610, as well as a deformable engagement spacer 620 (sandwiched between a nut 630 and washer 640). As can be seen in FIG. 7, the engagement fastener 610 is secured to the stem tube 460 at the stem engagement member aperture 530. Referring to FIG. 5B, the engagement member 500 restricts the relative angle at which the fork post 420 can be inserted in the stem tube 460, helping guide the stem unit 450 and fork unit 410 together in rotational alignment (by preventing complete insertion of the fork post 420 into the stem tube 460 unless in they are in the desired rotational position relative to each other). The alignment slot 510, which provides a track through which the engagement member 500 may pass, is preferably tapered, such that the engagement member 500 is more tightly "gripped" as it moves further into the alignment slot 510. The engagement spacer 620 which is preferably made of a deformable material such as polypropylene or other suitable thermoplastic polymer is squeezed as it moves further into the alignment slot 510, helping enhance grip and reduce play.

The stem-fork assembly 400 further includes a stem cap 630, a stem-fork cover 640, a stem-fork spring 650, an upper race 660, a pair of headsets 670, and a headtube 490. The headtube 490 may include a headtube aperture 680 formed therein. The headtube aperture 680, when aligned with the stem locking aperture 470 and the fork locking aperture 440, receives a portion of the fork locking pins 550 protruding out of the fork post 420. Preferably, the fork locking pins 550 and the headtube aperture 680 are sized such that the fork locking pins 550 do not protrude from the headtube 490 and a tool (such as a pin, small screwdriver, etc.) would be needed to press the fork locking pins 550 inward to "unlock" the stem tube 460 from the fork post 420.

Figure 9A:
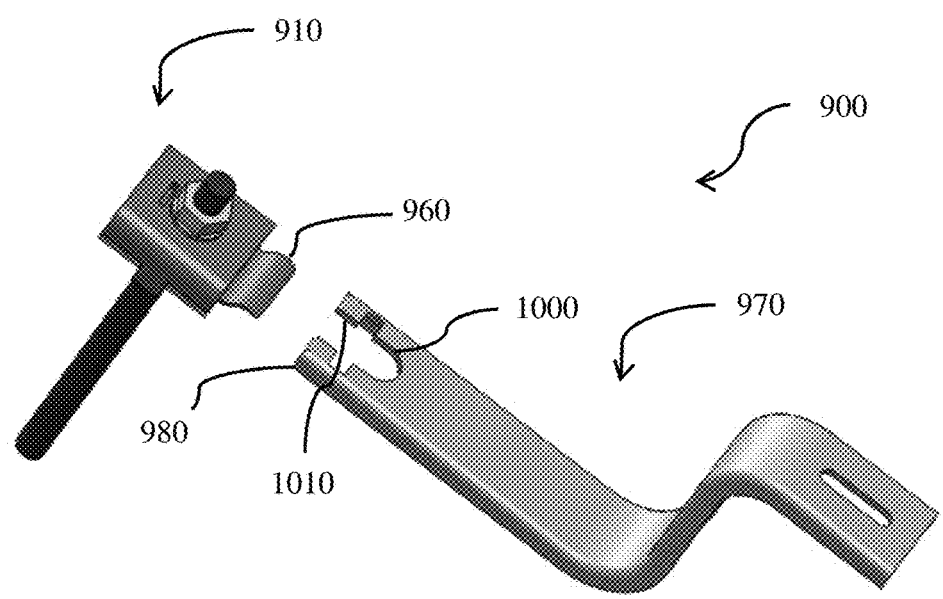
FIG. 9A shows an exemplary training wheel assembly 900 with a training wheel support 970 and a mounting unit 910 prior to installation of the training wheel assembly 900 on a bicycle.
Figure 9B:
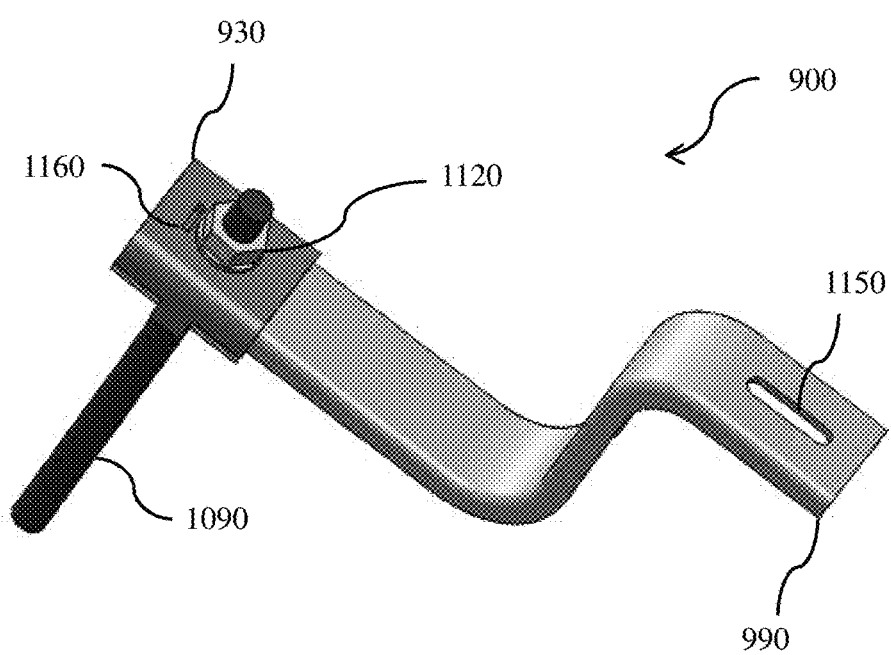
FIG. 9B shows the training wheel assembly 900 of FIG. 9A, with the training wheel support 970 inserted into the mounting unit 910 to secure the training wheel support 970 to the bicycle.
Figure 10A:
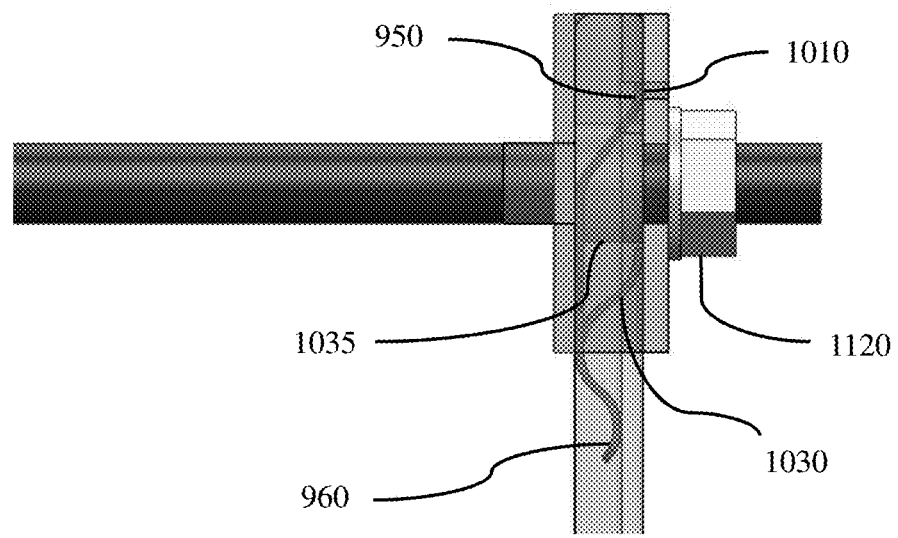
FIG. 10A is a side view of the training wheel assembly 900 of FIG. 9B, with a transparent capture member 1020 so as to show the interaction of a wheel spring member 920 with the capture member 1020 and the training wheel support 970.
Figure 10B:
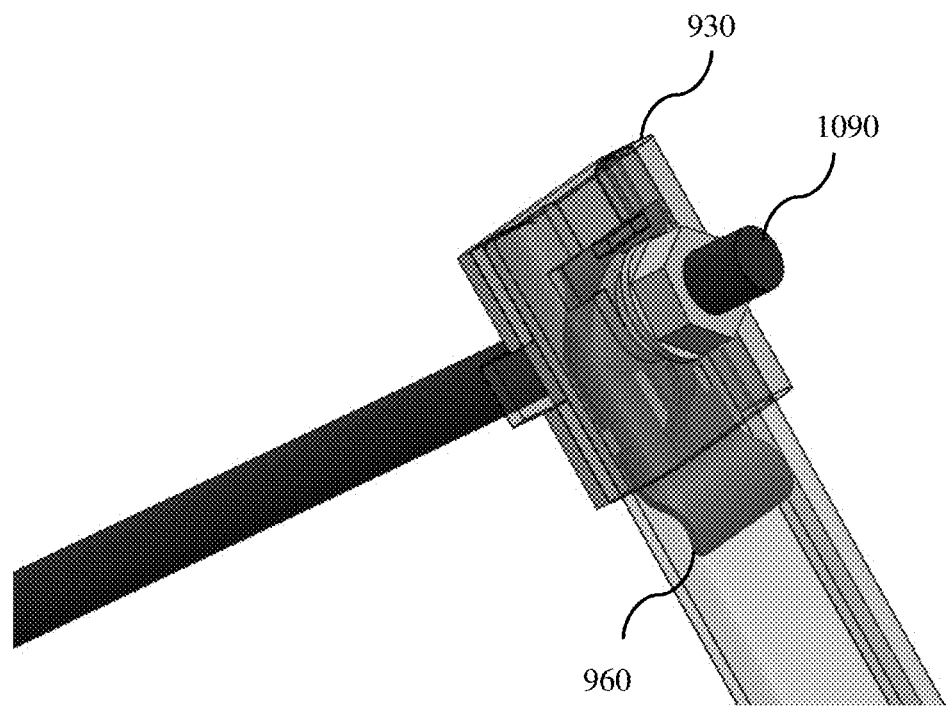
FIG. 10B is a perspective view of the training wheel assembly 900 of FIG. 10A.
Figure 11:
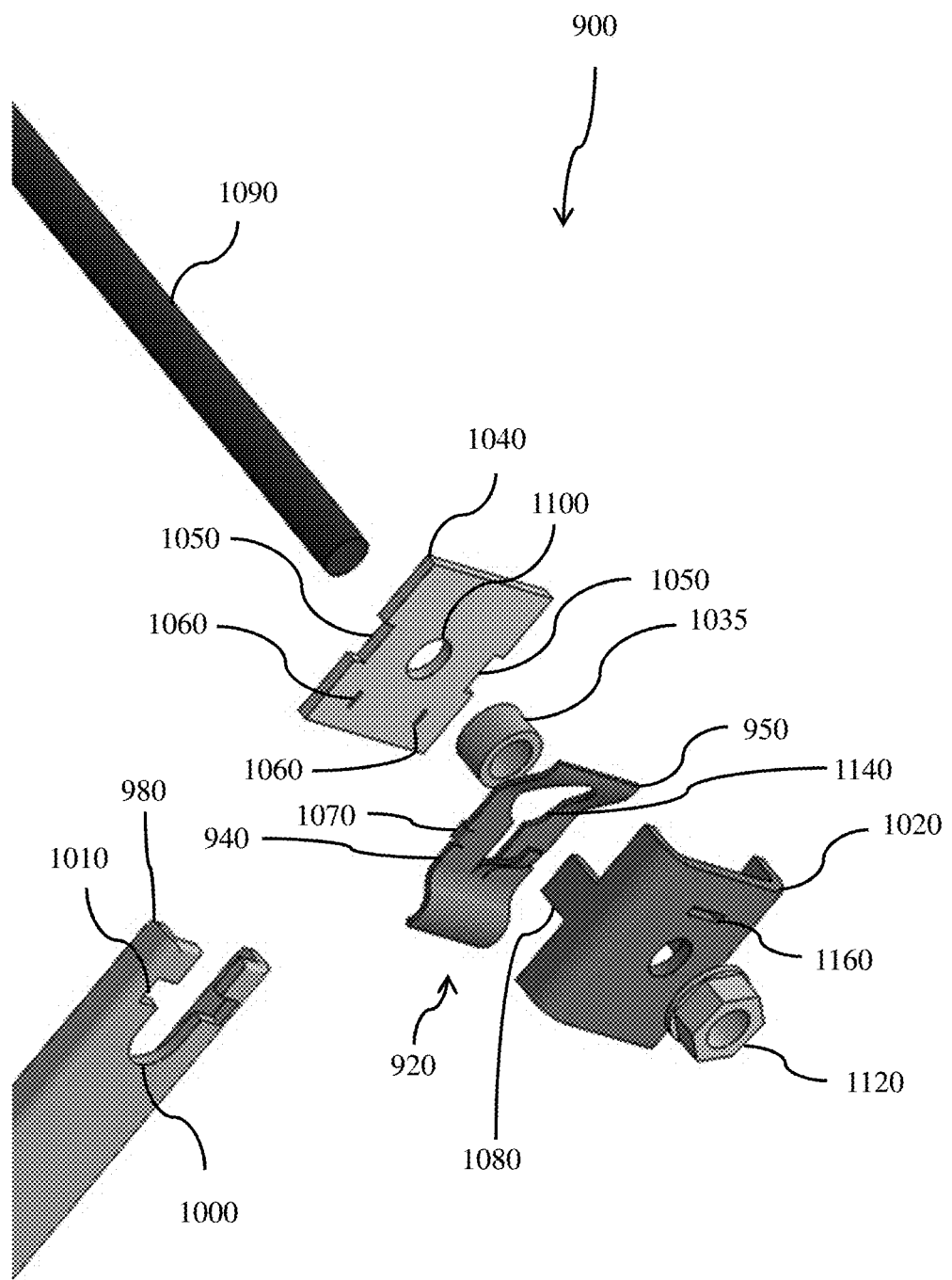
FIG. 11 is an expanded view of the components of the training wheel assembly 900 of FIGS. 10A and 10B.

Turning to the training wheel assembly 900 of FIGS. 9-11, the wheel spring member 920 may include a wheel spring tab 1030 extending from the medial portion 940 thereof. As shown in FIG. 10A, the wheel spring tab 1030 extends further outwardly from the medial portion 940 than the tension end 960 of the wheel spring member 920. This allows the wheel spring tab 1030 to abut the wheel spring housing 930 to help limit the motion of the wheel spring member 920 relative to the wheel spring housing 930. Referring to FIG. 11, the wheel spring housing 930 includes a mounting plate 1040 with a pair of mounting notches 1050 on opposing sides thereof, and a pair of mounting slots 1060 formed therein. The wheel spring member 920 includes a pair of spring flanges 1070 on opposing sides thereof (corresponding with the pair of mounting slots 1060) for securing the wheel spring member 920 to the mounting plate 1040. The wheel spring housing 930 further includes a capture member 1020 enclosing the wheel spring member 920, the capture member 1020 having a pair of capture member tabs 1080 extending from opposing sides thereof (corresponding with the pair of mounting notches 1050). The capture member 1020 can be secured to the mounting plate 1040 by engaging the capture member tabs 1080 with the mounting notches 1050. A bicycle axle 1090 could pass through a mounting axle aperture 1100 formed in the mounting plate 1040, and a capture axle aperture 1110 formed in the capture member 1020, to be secured to the mounting unit 910 using an axle nut 1120, as shown in FIG. 10B. A wheel assembly spacer 1035, which passes through a spacer aperture 1040 formed in the wheel spring member 920, fills the gap between the mounting plate 1040 and the capture member 1020, as can be seen in FIG. 10A.

At the training wheel end 990 of the training wheel support 970 is a training wheel slot 1150 for securing a training wheel (not shown). Once the training wheel support 970 is inserted in the mounting unit 910 by hand, the training wheel support 970 cannot be pulled back out without the use of tools. But the training wheel assembly 900 is removable, with the use of tools, if a rider would like to use the bicycle without training wheels. The capture member 1020 includes a release slot 1160 positioned such that when the training wheel support 970 is installed in the mounting unit 910, the release slot 1160 provides access to the engagement end 950 of the wheel spring member 920. Using a pin or small screwdriver, a user may push against the engagement end 950 of the wheel spring member 920 through the release slot 1160 to disengage the engagement end 950 of the wheel spring member 920 from the engagement slot 1000 of the training wheel support 970, allowing the user to pull the training wheel support 970 back out of the mounting unit 910.

Initially, it must be kept in mind that the quick-assembly bicycle components shown in the accompanying drawings and discussed above are merely exemplary, and may assume a wide variety of configurations different from those noted, and may use components different from those noted. It should also be understood that various terms referring to orientation and position used throughout this document are relative terms rather than absolute ones. In other words, it should be understood (for example) that whether a component is "vertical" would depend on the orientation of the bicycle on which the component is installed. Such terms, and others including "forward," "rearward," "left," "right," "up," "down," "outwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, although the above assemblies and components have been discussed in the context of a child's bicycle, one which might be used with training wheels, the pedal assembly 100 and stem-fork assembly 400 could be used in similar fashion with bicycles for older riders.

Second, although all three of the above assemblies—i.e., the pedal assembly 100, the stem-fork assembly 400, and the training wheel assembly 900—can be used in a bicycle (commonly, a children's bicycle, because of the training wheel assembly 900), one or two of the assemblies could be selected as desired for use (as-is or with minor modifications) in various bicycles.

Third, although in the "folded" position of the pedal assembly 100 in FIG. 1A, the pedal bodies 120 point downwards (when installed in an upright bicycle), the pedal bodies 120 can be positioned in any other suitable manner that "folds" or "tucks" the pedal bodies 120 so as to use space in a package as desired. For example, the pedal bodies 120 can instead point "upwards," or at another appropriate angle as permitted by packaging and by the adjacent components of the bicycle in which the pedal assembly 100 is installed. If the pedal assembly 100 is being shipped in isolation, or otherwise not connected to a bicycle, the pedal bodies 120 could also be pointed "inwards," with each pedal bodies 120 turned 180 degrees from the positions shown in the "open" position of FIG. 1B.

Fourth, although in the pedal assembly 100, the pedal locking member 150 and the pedal spring member 200 are shown as cylindrical pins, they can be replaced by any structure that provides the same or similar functionality, such as an integral flange/protrusion, a non-cylindrical (such as one that is V-shaped) pin, etc.

Fifth, although the stem-fork assembly 400 is shown with the fork post 420 entering the stem tube 460, the assembly can be reconfigured such that the stem tube 460 is inserted into the fork post 420. Apertures, slots, etc. could also be swapped as desired to accommodate such a modified configuration. For example, the alignment slot 510 formed at the end of the fork post 420 could instead be formed at the end of the stem tube 460.

Sixth, although the fork locking member 430 includes a V-shaped fork locking body 540 in the version depicted in the drawings, it can be replaced by any structure that provides the same or similar functionality, such as a spring inside a cylindrical pinsleeve with one or more pins, and one or more apertures through which the pins are urged out by the spring.

Seventh, although the mounting unit 910 is shown as having a wheel spring housing 930 with multiple separate components fastened or otherwise secured to each other, the mounting unit 910 can have fewer (or more) components, such that various parts are integrated with each other rather than being separate components. For example, the mounting plate 1040 and the wheel spring member 920 can be fused into one integrated component. Also, although the wheel spring member 920 is shown to be secured to the mounting plate 1040 via tabs, the two can be secured to each via other means such as rivets or other fasteners.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:
1. An easy-to-assemble bicycle including:
  a. a stem-fork assembly;
  b. a training wheel assembly; and
  c. a pedal assembly having:
   1) a pedal axle with a pedal body extending therefrom, the pedal axle having an axle notch and a shallow detent formed therein;

2) a crank arm received in the pedal axle;
3) a pedal locking member protruding radially from the crank arm, wherein the pedal locking member is sized to be:
   (a) received in the axle notch, and
   (b) partially received within the shallow detent;
4) a pedal spring urging the pedal axle axially along the crank arm and against the pedal locking member, wherein the pedal axle is rotatable about the crank arm until the pedal locking member aligns with the axle notch and nests therein to rotationally lock the pedal axle with respect to the crank arm.

2. The bicycle of claim 1 further including a cover concealing the pedal locking member and the axle notch.

3. The bicycle of claim 1 wherein the axle notch is sized to receive at least substantially all of the diameter of the pedal locking member therein.

4. The bicycle of claim 1 wherein the pedal axle is not rotationally locked with respect to the crank arm when the pedal locking member is received in the shallow detent.

5. The bicycle of claim 1 wherein the pedal axle is at least rotatable between:
   a. an open position in which the pedal locking member is aligned with the shallow detent; and
   b. a folded position in which the pedal locking member is aligned with the notch.

6. The bicycle of claim 1 wherein the notch is circumferentially spaced at least substantially 30 degrees from the shallow detent.

7. The bicycle of claim 1 wherein the crank arm includes a pedal locking aperture through which the pedal locking member extends.

8. The bicycle of claim 1 wherein:
   a. the pedal axle is a first pedal axle, and the pedal body is a first pedal body, the first pedal axle and the first pedal body being secured to a first end of the crank arm; and
   b. the pedal assembly further includes a second pedal axle and a second pedal body, the second pedal axle and the second pedal body being secured to a second end of the crank arm opposing the first end of the crank arm.

9. The bicycle of claim 1 wherein the pedal locking member is a pedal locking pin extending radially out from one or both sides of the crank arm.

10. The bicycle of claim 1 further including a pedal spring member extending through a pedal spring member aperture formed in the crank arm, wherein the pedal spring is at least partly compressed axially along the crank arm between the pedal axle and the pedal spring member.

11. The easy-to-assemble bicycle of claim 1 wherein the stem-fork assembly includes:
   a. a fork unit including an elongated fork post having a fork locking aperture formed in a fork post wall thereof;
   b. a stem unit:
      1) including a stem tube having a stem locking aperture formed in a stem tube wall thereof,
      2) wherein one of the stem tube and the fork post is configured to receive the other therein;
   c. a fork locking member which is either:
      1) situated within the fork post in alignment with the fork locking aperture, the fork locking member being spring-biased to extend through the fork locking aperture into the stem locking aperture when the stem locking aperture is aligned with the fork locking aperture; or
      2) situated within the stem tube in alignment with the stem locking aperture, the fork locking member being spring-biased to extend through the stem locking aperture into the fork locking aperture when the fork locking aperture is aligned with the stem locking aperture,
   wherein the stem tube and fork post are axially and rotationally locked with respect to each other when the fork locking member extends through both the stem locking aperture and the fork locking aperture.

12. The bicycle of claim 11 wherein the fork locking member includes a V-shaped fork locking body and a pair of fork locking pins, wherein the fork locking body is resiliently flexible such that the fork locking body:
   a. is compressed to fit in one of the stem tube and the fork post; and
   b. urges the pair of fork locking pins in opposing directions.

13. The bicycle of claim 12 further including a fork locking guide situated so as to restrict the fork locking body from compressing to the extent that the fork locking member is free to move axially within the stem tube or the fork post wherein the fork locking body is fit.

14. The bicycle of claim 11 further including a headtube sized to receive the stem tube therethrough, the headtube positioned to conceal the fork locking member.

15. The bicycle of claim 14 wherein the fork locking member is urged towards the headtube when:
   a. the fork post and stem tube are received in the headtube; and
   b. the fork and stem locking apertures are aligned with the fork locking member.

16. The bicycle of claim 11 wherein:
   a. one of the stem tube and the fork post further includes an alignment slot formed in an end thereof;
   b. the other of the stem tube and the fork post further includes an engagement member sized to be received in the alignment slot; and
   c. the engagement member is received within the alignment slot when the fork locking member extends through both the stem locking aperture and the fork locking aperture.

17. The bicycle of claim 16 wherein the alignment slot:
   a. extends from a slot opening to a slot end; and
   b. is tapered such that the slot opening is wider than the slot end.

18. The bicycle of claim 17 wherein the engagement member includes a deformable spacer sized such that the spacer is deformed as it moves towards the slot end of the alignment slot.

19. An easy-to-assemble bicycle including:
   a. a stein-fork assembly;
   b. a training wheel assembly including:
      (1) a mounting unit including a wheel spring member situated in a wheel spring housing, the wheel spring member having an engagement end and a tension end extending from opposing sides of a medial portion, the engagement end and the tension end being resiliently flexible;
      (2) a training wheel support extending from a wheel end to an insertion end, the insertion end having an engagement slot formed therein, the engagement slot having a wheel spring engagement surface, wherein the training wheel support is securable to the mounting unit by sliding the insertion end into the mounting unit such that:

(a) the tension end of the wheel spring member slides past the engagement slot, and
(b) the engagement end of the wheel spring member engages the wheel spring engagement surface of the engagement slot; and
c. a pedal assembly having:
1) a pedal axle with a pedal body extending therefrom, the pedal axle having an axle notch formed therein;
2) a crank arm received in the pedal axle;
3) a pedal locking member protruding radially from the crank arm, the pedal locking member being sized to be received in the axle notch;
4) a pedal spring urging the pedal axle axially along the crank arm and against the pedal locking member, wherein the pedal axle is rotatable about the crank arm until the pedal locking member aligns with the axle notch and nests therein to rotationally lock the pedal axle with respect to the crank arm.

20. The bicycle of claim 19 wherein the wheel spring housing includes a release slot formed therein, the release slot providing access to the engagement end of the wheel spring member.

21. The bicycle of claim 20 wherein the training wheel support is detachable from the mounting unit by using a tool to press against the engagement end of the wheel spring member to disengage the engagement end from the engagement slot of the training wheel support.

22. The bicycle of claim 19 wherein the wheel spring member further includes a wheel spring tab extending from the medial portion thereof, the wheel spring tab abutting the wheel spring housing to limit the motion of the wheel spring member relative to the wheel spring housing.

23. The bicycle of claim 19 wherein the wheel spring housing includes a mounting plate and a capture member on opposite sides of the wheel spring member.

24. The bicycle of claim 23 wherein the wheel spring member is fixed to the mounting plate.

25. The bicycle of claim 19 wherein:
a. the wheel spring housing includes an axle aperture formed therein; and
b. the training wheel assembly further includes an axle extending through the wheel spring housing.

26. The bicycle of claim 19 further including a wheel assembly spacer extending:
a. through the wheel spring member; and
b. between opposing sides of the wheel assembly housing.

27. The bicycle of claim 19 wherein:
a. the training wheel assembly further includes a wheel assembly spacer extending through the wheel spring member; and
b. the wheel spring member further includes a wheel spring tab extending from the medial portion thereof, the wheel spring tab abutting the wheel assembly spacer.

28. An easy-to-assemble bicycle including:
a. a stem-fork assembly;
b. a training wheel assembly including:
(1) a mounting unit including a wheel spring member situated in a wheel spring housing, the wheel spring member having an engagement end and a tension end extending from opposing sides of a medial portion, the engagement end and the tension end being resiliently flexible;
(2) a training wheel support extending from a wheel end to an insertion end, the insertion end having an engagement slot formed therein, the engagement slot having a wheel spring engagement surface, wherein the training wheel support is securable to the mounting unit by sliding the insertion end into the mounting unit such that:
(a) the tension end of the wheel spring member slides past the engagement slot, and
(b) the engagement end of the wheel spring member engages the wheel spring engagement surface of the engagement slot; and
c. a pedal assembly having:
1) a pedal axle with a pedal body extending therefrom, the pedal axle having an axle notch and a shallow detent formed therein;
2) a crank arm received in the pedal axle;
3) a pedal locking member protruding radially from the crank arm, wherein the pedal locking member is sized to be:
(a) received in the axle notch, and
(b) partially received within the shallow detent;
4) a pedal spring urging the pedal axle axially along the crank arm and against the pedal locking member, wherein the pedal axle is rotatable about the crank arm until the pedal locking member aligns with the axle notch and nests therein to rotationally lock the pedal axle with respect to the crank arm.

* * * * *